US012719706B2

(12) United States Patent
Teutsch

(10) Patent No.: US 12,719,706 B2
(45) Date of Patent: Aug. 25, 2026

(54) VERIFIABLE CODE EXECUTION VIA ROLE-BASED VALIDATION

(71) Applicant: Truebit Co., Buffalo Grove, IL (US)

(72) Inventor: Jason Richmond Teutsch, Buffalo Grove, IL (US)

(73) Assignee: Truebit Co., Buffalo Grove, IL (US)

( * ) Notice: Subject to any disclaimer, the term of this patent is extended or adjusted under 35 U.S.C. 154(b) by 68 days.

(21) Appl. No.: 18/872,136

(22) PCT Filed: Jun. 6, 2023

(86) PCT No.: PCT/US2023/024533
§ 371 (c)(1),
(2) Date: Dec. 5, 2024

(87) PCT Pub. No.: WO2023/239692
PCT Pub. Date: Dec. 14, 2023

(65) Prior Publication Data

US 2025/0358136 A1 Nov. 20, 2025

Related U.S. Application Data

(60) Provisional application No. 63/349,889, filed on Jun. 7, 2022.

(51) Int. Cl.
*H04L 9/00* (2022.01)
*H04L 9/32* (2006.01)

(52) U.S. Cl.
CPC .............. *H04L 9/50* (2022.05); *H04L 9/3271* (2013.01)

(58) Field of Classification Search
CPC ............ H04L 9/32; H04L 9/3271; H04L 9/50
See application file for complete search history.

(56) References Cited

U.S. PATENT DOCUMENTS

2019/0342084 A1* 11/2019 Mehedy ................ H04L 9/0643
2020/0044831 A1* 2/2020 Soundararajan .......... H04L 9/50
2020/0076884 A1* 3/2020 Li ......................... H04L 9/0637
2020/0322132 A1 10/2020 Covaci et al.
2021/0073212 A1* 3/2021 Conley ................. H04L 9/3213
2021/0226774 A1 7/2021 Padmanabhan
2021/0367762 A1 11/2021 Bae et al.

(Continued)

OTHER PUBLICATIONS

"Building Components. A tutorial on how to create components and use them in a pipeline", Kubeflow, 7 pages, https://web.archive.org/web/20220601034504/https://www.kubeflow.org/docs/components/pipelines/sdk/component-development/, May 5, 2022.

(Continued)

*Primary Examiner* — D'Arcy Winston Straub
(74) *Attorney, Agent, or Firm* — Lempia Summerfield Katz LLC

(57) ABSTRACT

A controller-treasurer node may access a transcript within off-chain storage with respect to a particular distributed ledger. The transcript may include an execution profile for an execution of executable code by a solver node. Based on the transcript, the controller-treasurer may determine whether the solver node correctly executed the code. When the controller-treasurer node determines that the execution profile indicates a correct execution, the controller-treasurer node may commit an indication of the validity of the execution profile to the particular distributed ledger.

20 Claims, 3 Drawing Sheets

(56) References Cited

U.S. PATENT DOCUMENTS

| | | | | |
|---|---|---|---|---|
| 2022/0084020 | A1* | 3/2022 | Gervais | H04L 9/3239 |
| 2025/0148460 | A1* | 5/2025 | Wright | H04L 9/3297 |

OTHER PUBLICATIONS

"Building Python function-based components", Kubeflow, 8 pages, https://web.archive.org/web/20220521210425/ https://www.kubeflow.org/docs/components/pipelines/sdk/python-function-components/, Feb. 20, 2022.
"Cartesi RISC-V Solidity Emulator", 4 pages, https://web.archive.org/web/20230127235725/https://github.com/cartesi/machine-solidity-step, Jul. 9, 2020.
"Component. Conceptual overview of components in Kubeflow Pipelines", 2 pages, https://www.kubeflow.org/docs/components/pipelines/concepts/component/, Nov. 2021.
"Comprehensive repo for creating, issuing, solving, and verifying Truebit tasks on Ethereum", Truebit Protocol, 30 pages, https://web.archive.org/web/20221205190235/https://github.com/TruebitProtocol/truebit-eth, 2022.
"Configure Pods and Containers", Kubernetes, 2 pages, https://web.archive.org/web/20210805021310/https://kubernetes.io/docs/tasks/configure-pod-container/, Jun. 2021.
"Getting started with Truebit on Ethereum", Medium, Truebit Protocol, 12 pages, https://medium.com/truebit/getting-started-with-truebit-on-ethereum-ac1c7cdb0907, Apr. 14, 2021.
"Introduction to Multi-use Isolation", Kubeflow, 1 page, https://web.archive.org/web/20220626074137/https://www.kubeflow.org/docs/components/multi-tenancy/overview/, Nov. 5, 2021.
"IPFS powers the Distributed Web", 2 pages, https://web.archive.org/web/20220804003353/https://ipfs.tech/, 2022.
"Kubernetes: Production-Grade Container Orchestration", 5 pages, https://web.archive.org/web/20220104163753/https://kubernetes.io/, Jan. 2022.
"My first impression of web3", 7 pages, https://moxie.org/2022/01/07/web3-first-impressions.html, Jan. 7, 2022.
"Open-source Version Control System for Machine Learning Projects", 4 pages, https://dvc.org/, Jun. 2, 2022.
"Organizing Cluster Access Using kubeconfig Files", Kubernetes, 3 pages, https://web.archive.org/web/20210812135149/https://kubernetes.io/docs/concepts/configuration/organize-cluster-access-kubeconfig/, Jun. 2021.
"Overview. Get a high-level outline of Kubernetes and the components it is built from", 1 page, https://web.archive.org/web/20210813015205/https://kubernetes.io/docs/concepts/overview/, Jun. 2021.
"Pisa: Arbitration Outsourcing for State Channels", In Proceedings of the 1st ACM Conference on Advances in Financial Technologies, AFT '19, pp. 16-30, New York, NY, USA, 2019.
"Quickstart. Getting started with Kubeflow Pipelines", 5 pages, https://web.archive.org/web/20240721103726/https://www.kubeflow.org/docs/components/pipelines/legacy-v1/overview/quickstart/, May 5, 2022.
"Run and Recurring Run. Conceptual overview of runs in Kubeflow Pipelines", 1 page, https://web.archive.org/web/20211130024632/https://www.kubeflow.org/docs/components/pipelines/concepts/run/, Nov. 2021.
"Step. Conceptual overview of steps in Kubeflow Pipelines", 1 page, https://web.archive.org/web/20211130025539/https://www.kubeflow.org/docs/components/pipelines/concepts/step/, Nov. 2021.
"Use containers to Build, Share and Run your applications", Docker, 6 pages, https://web.archive.org/web/20220117164027/https://www.docker.com/resources/what-container, Jan. 2022.
Conor Leary, "Avalanche Bridge: Secure Cross-Chain Asset Transfers Using Intel SGX", Medium, 16 pages, https://medium.com/avalancheavax/avalanche-bridge-secure-cross-chain-asset-transfers-using-intel-sgx-b04f5a4c7ad1, Aug. 5, 2021.
International Preliminary Report for International Application No. PCT/US2023/024533 mailed on Dec. 10, 2024.
International Search Report and Written Opinion of the International Searching Authority in International Patent Application No. PCT/US2023/024533, mailed Sep. 5, 2023.
Intro to Kubeflow Pipelines, https://www.youtube.com/watch?v=_AY8mmbR1o4, 2021.
Kale, Kubeflow, 5 pages, https://web.archive.org/web/20210222012225/https://github.com/kubeflow-kale/kale#readme, 2021.
Open Contracts, ©2022, https://www.opencontracts.io/, 2 pages.
Paweł Kijko, "The Best Kubeflow Alternatives", 10 pages, https://web.archive.org/web/20220626024752/https://neptune.ai/blog/the-best-kubeflow-alternatives, Feb. 9, 2022.
Streams. Data Structures Core to Ceramic, 2 pages, https://developers.ceramic.network/docs/protocol/js-ceramic/streams/streams-index, May 24, 2022.
Teutsch et al., "A scalable verification solution for blockchains", 50 pages, Nov. 16, 2017.
Teutsch et al., "Retrofitting a two-way peg between blockchains", 49 pages, Oct. 15, 2018.
TruebitProtocol/wiki, Truebit VM Spec, 13 pages, https://web.archive.org/web/20210507042519/https://github.com/TruebitProtocol/wiki/blob/master/docs/vm_spec.md, 2018.

* cited by examiner

VERIFIABLE CODE EXECUTION VIA ROLE-BASED VALIDATION

PRIORITY

This application claims priority to PCT International Patent Application No. PCT/US2023/024533, filed Jun. 6, 2023, titled VERIFIABLE CODE EXECUTION VIA ROLE-BASED VALIDATION, which claims priority to U.S. Provisional Patent Application No. 63/349,889, filed Jun. 7, 2022, titled Verifiable Code Execution, each of which being incorporated by reference in its entirety.

TECHNICAL FIELD

This disclosure relates to verifiable execution of code.

BACKGROUND

Rapid advances in electronics and communication technologies, driven by immense customer demand, have resulted in the widespread adoption of electronic transactions, record keeping, and executable-code-based agreement formation. As one example, e-currencies, such as Bitcoin, have displaced paper currencies in millions of transactions per year. Improvements in tracking and/or knowledge management attached to such electronic interactions and tracking will continue to increase the features and options available to operators engaging in electronic transactions.

DETAILED DESCRIPTION

Figure 1:
FIG. 1 shows an example code validation environment.
Figure 1:
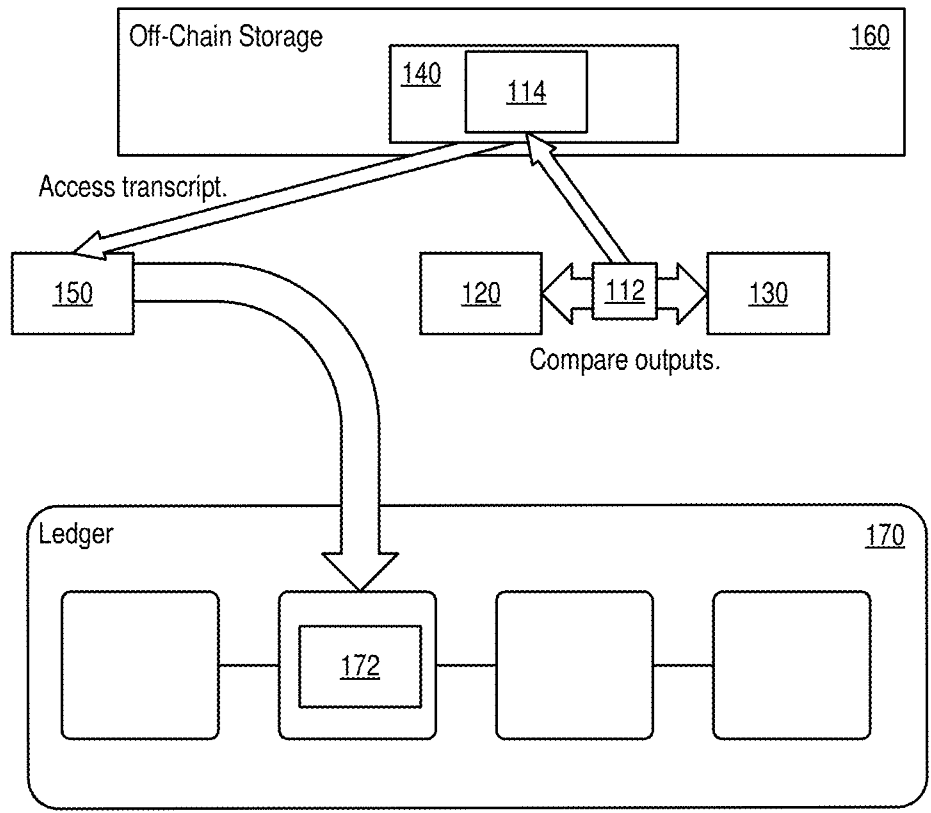

A blockchain may include a series of data blocks, the blocks including a code, such as a cryptographic hash or checksum, which may be consistent with the content of previous blocks in the series. In some cases, determining multiple different sets of blocks that produce the same code may be insoluble, prohibitively computationally complex, or otherwise effort intensive enough to frustrate attempts to tamper with the contents of the blockchain while maintaining the self-consistence of the codes. Accordingly, users of the blockchain may have trust that the content of the blockchain remains in an unaltered state as long as the content is consistent with the codes stored on the blockchain.

In various systems, blockchains, or more generally, ledger technologies (such as distributed ledgers, and/or other recordation systems which may use blockchains and/or self-consistent cryptographic architectures other than blockchains), provide a platform for multiple parties to share access to data with the ability to verify the validity and integrity of that data. Various implementations that may be used with blockchains may also be used with other ledger technologies.

Conversely, content stored/recorded outside of the cryptographic structure of the distributed ledger may be in an 'off-chain' environment. The off-chain environment includes non-ledger/non-ledger-referenced storage and also may include on-chain material for other ledgers. In some cases, two different ledgers may not necessarily have trust overlap (e.g., because the ledgers lack interoperability, asset inter-chain mobility, and/or other trust transport across the ledger structures). Therefore, content recorded on one of the ledgers may not necessarily be validated under the protocols (or otherwise trusted) on the other. Accordingly, the space of off-chain resources (e.g., storage and/or computing resources) for any particular distributed ledger may include on-chain resources for other distributed ledgers.

In various implementations, a task giver or other task source may provide a task that includes the execution of code. In various scenarios, the executable code associated with the task may be code for which the task giver may later rely on (or later attempt to prove) as executed accurately to produce the result being purported as correct by the task giver. In some cases, the task giver may use a code execution platform in which the execution result may be challenged to ensure execution was accurate and done with fidelity to the provided code.

In various implementations, a code execution protocol may include execution of the code by a solver that produces a solver output. The solver output may be compared to one or more verifier outputs produced by verifiers purporting to execute identical code. When the outputs match, the match may provide evidence that the code was executed accurately and with fidelity by both solver and verifier(s). Mismatches may provide evidence of inaccurate and/or low-fidelity execution of the code by one or more of the parties. Further analysis, initiated as result of the mismatch, may provide the origin of the mismatch to assist in the identification of error/inaccuracies in the execution.

In some cases, the solver and/or verifiers may execute the code in a contention-based protocol where the solver and/or verifiers may receive a set of tokens for accurate execution. Additionally or alternatively, solver and/or verifiers may surrender a counter-set of tokens for inaccurate, incomplete, and/or otherwise low-fidelity execution. Additionally or alternatively, solver and/or verifiers may act in contention where providing an accurate execution when a counterpart provides inaccurate execution entitles the party prevailing in the contention protocol control of the counter-set of the other party. Control (e.g., by a solver, verifier, task giver or other party) of a token set/counter-set may, in some cases, include control of a sub-set of the set/counter-set. In other words, control of a set/counter-set may not necessarily be total. The record, e.g., recorded as a 'transcript' may be later referenced as evidence that the code was executed as recorded and/or that the solver and/or verifier performed various actions in the proper order with the correct timing. For example, the transcript may include indications that the solver committed to a solution and/or revealed a solution in a proper order and/or with the proper timing. The transcript may be recorded in various environments included 'off-chain' environments as discussed below.

In various implementations, the controller-treasurer may perform various operations using off-chain resources and provide a final result verification. In some cases, the controller-treasurer itself may be off-chain and the results may be onboarded by other participants in the ledger. For example, by reputation, the controller-treasurer may have status on a particular ledger and actions by the controller-treasurer may be treated as validated on that ledger. However, the controller-treasurer itself may be unaware of this mirroring of its actions onto the ledger.

The contention protocol may include solver-verifier contention protocols such as those discussed in U.S. Patent Application Publication No. 2023/0047924, entitled Ledger-based verifiable code execution, which is incorporated by reference in its entirety herein. Therein, a solver and verifier implement a contention protocol to create a verifiable execution of a task (including executable code) provided by a task giver.

In various implementations, the solver-verifier contention may be validated by one or more additional nodes such as controller-treasurer nodes. Some implementations, additionally or alternatively, may include validation by a judge node. In some cases, the use of additional role may allow for authoritative validation of the code execution and contention protocol. Authoritative validation may be advantageous because the controller-treasurer node and/or judge node may have a reputational history and/or association with the distributed ledger that may be lacked by the solver and/or verifier. In some cases, repeating an off-chain validation by a judge (which may act as a controller-treasurer node for an entirely different ledger) may be valuable because the judge may lack the status on the ledger to which the solver output is being validated. Accordingly, through the use of roles, such as a controller-treasurer, solver-verifier contentions from off-chain sources may be 'natively' validated onto a distributed ledger.

Efficiency and smart contract execution costs have increasingly pushed more and more ledger-consequential computing (e.g., computing that effects the disposition of on-chain assets, contract outputs, and/or other on-chain transactions/operations) to off-chain computing resources. Furthermore, the growing eco-system of distributed ledgers has increased demand not just for interoperability via asset mobility among chains but also interoperability of validated code execution. Thus, there is demand for systems that allow for code to be executed off-chain (including execution that is on-chain for another distributed ledger) and then validated without use of on-chain resources to re-execute the code. The techniques and architectures discussed herein provide protocols, cryptographic validation schemes, and computer node operations that allow for such on-chain validation of off-chain code execution. Thus, the techniques and architectures discussed herein provide a technical solution to the technical problem of validated code execution transport from off-chain environments to on-chain validated status. Due to this technical solution, techniques and architectures herein provide an improvement over existing systems and other market-based alternatives.

FIG. 1 shows an example code validation environment (CVE) 100. In the example CVE 100, a solver 120 may participate in contention protocol to execute executable code 112 to produce an execution profile 114 and/or record thereof in a transcript 140. The execution profile 114 may include a solution (e.g., a result output from execution of the executable code). The transcript may further include a detailed record of the execution and/or execution of contention protocol as a set of ordered steps. In various implementations, the executable code may be part of a task assigned by the task giver or from another code source. Furthermore, one or more verifiers 130 may challenge the solver 120 within the contention protocol.

A controller-treasurer 150 for a distributed ledger 170 may access the transcript 140, which may be stored in an off-chain storage location 160, e.g., off-chain at least with regard to the particular distributed ledger 170. Based on transcript 140, the controller-treasurer 150 may validate the execution profile 114 by the solver for the distributed ledger for on-chain reliance. The controller-treasurer 150 may cause recordation of an indication 172 of the validation of the execution profile 114 on the distributed ledger 170.

Figure 2:
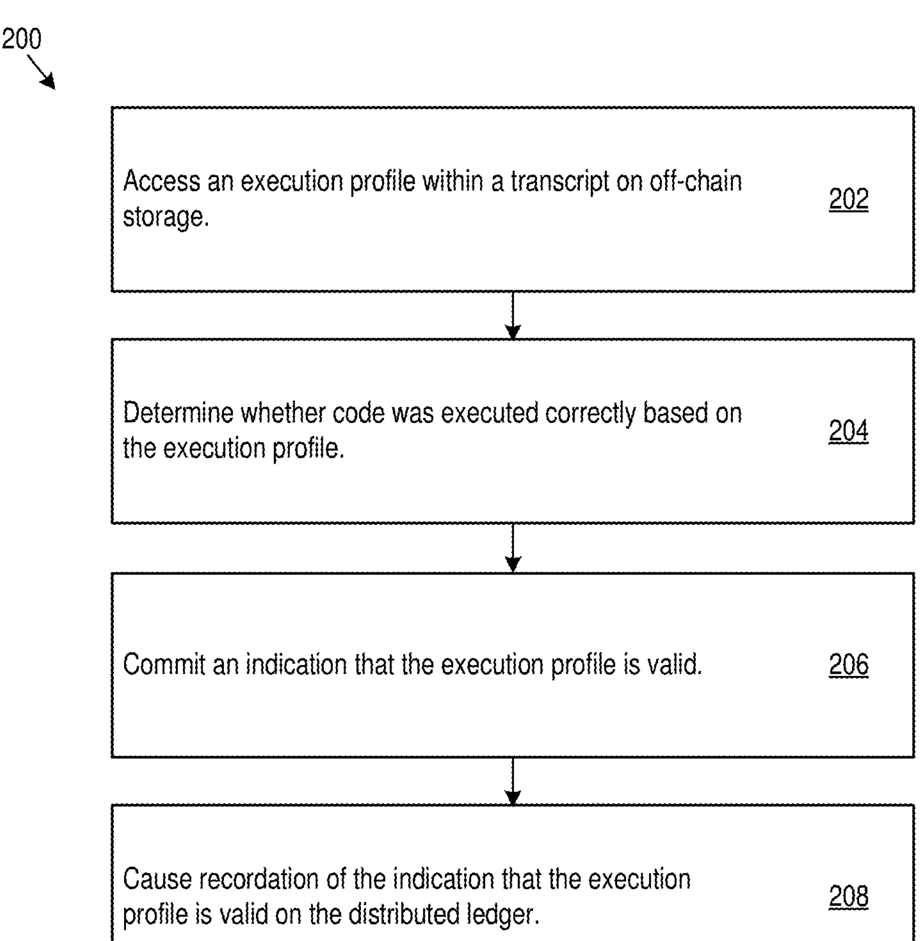
FIG. 2 shows example role-execution logic.

Referring now to FIG. 2 while continuing to refer to FIG. 1, example role-execution logic 200 is shown. The role-execution logic 200 may execute on circuitry, e.g., such as role-execution circuitry present on a computing node. In some implementations, the role-execution logic 200 may execute the operations associated with one or more roles, e.g., such as a controller role, a treasurer role, a combined controller-treasurer role, a judge role, and/or other role.

The role-execution logic 200 may access the transcript 140, which may be stored within the off-chain storage location 160 (202). In some implementations, accessing the transcript 140 may include reading the transcript from records stored in association with another distributed ledger. In some implementations, accessing the transcript 140 may include accessing the off-chain storage location 160 in response to a designation by the solver (or other participant) generated as part of the contention protocol. For example, the solver may commit the solution to a particular storage location and provide an indicator of the location. In some implementations, the solver may include a reveal of the solution as an operation within the contention protocol. The reveal may include location information for the solution and/or the commit for the solution. The access by the role-execution logic 200 may be in response to the indication.

The example role-execution logic 200 may determine, based on the transcript 140, the execution profile 114 indicates that the executable code 112 was executed correctly (204). In various implementations, the example role-execution logic 200 may review the execution profile 114 to determine whether indicators of correct execution are present. For example, the role-execution logic 200, e.g., operating in a controller-treasurer role, may determine whether a particular ordered set of operations is present. For example, the role-execution logic 200 may determine whether the solver 120 committed to a solution and/or revealed a solution in a proper order. In some cases, determining the proper order may include determining whether the actions occurred within a particular timeout window for the executable code (or an associated task). In some cases, determining the presence of a proper ordered set may include determining whether a description of the code execution (e.g., without inconsistencies) is present within the execution profile 114. The role-execution logic 200 may further validate verifier 130 solutions, e.g., when detailed within the execution profile 114 and/or as separate validation operations.

In some implementations, the role-execution logic 200 may rely on an off-chain validation operation performed by another node e.g., such as a node implementing a judge role. For example, a node executing a controller-treasurer role for another distributed ledger may validate the execution profile 114 for that other distributed ledger, which may include causing a transfer of a set and/or counter-set tokens. The transfer of assets in this manner on the other distributed ledger may indicate confidence in the validity of the execution profile on that other distributed ledger. Thus, the role-execution logic 200 may reproduce that validity natively on its own distributed ledger 170. Judge reputation, solver reputation, controller-treasurer reputation, and/or other indicators may be used to determine whether a previous validation may be used.

The example role-execution logic 200 may commit, e.g., responsive to the validity determination, an indication that the solver correctly executed the code (206). The indication may include a record indicating the validity of the execution profile 114 that the role-execution logic then causes to be recorded on the distributed ledger 170 (208). Once recorded, the validation may be relied upon for subsequent operations within the distributed ledger 170. For example, the recordation of the validity may cause a transfer of a set and/or counter set of tokens to the solver 120 and/or the verifier 130. Thus, at least a portion of the transcript 140 (e.g., at least the execution profile 114) is validated for later reliance on the distributed ledger 170. The validation on the distributed ledger may be referenced alongside the solution when relying on the solution for future operations on the distributed ledger 170 to indicate trust in the solution specific to the distributed ledger 170.

To establish an ordered set of operations for the contention. protocol, the solver may commit to a solution. The solver commitment may include the solver output in a cryptographic form that binds the solver to the solver output without disclosing the solver output. For example, the solver commitment may include a hash the solver output with a random salt. In the example, the solver could prove that the solver had possession of the solver output at the time the solver commitment was recorded by providing the hash key and the salt. The solver may cause recordation of the solver commitment on the ledger.

In some implementations, for a proper ordered set the solver or verifier may be constrained in the amount of time that is allowed for execution of the task code. For example, the task may include a timeout window in which the code should be executed. In some cases, the timeout window may be expressed in a time value such as hours, minutes, seconds, microseconds, or other time value. In some cases, the timeout window may be expressed in a ledger-related value. For example, the timeout window may be expressed as a block limit. A block limit may include a specific number of blocks that may be added to a timing ledger before the timeout window expires. In some cases, the timing ledger may be the same ledger as a ledger on which the task is posted. In some cases, the timing ledger may be different from the ledger on which the task is posted. For example, the ledger on which the task is posted may include a private, service/application specific, and/or limited access blockchain while the timing ledger may include a public and/or widely used blockchain such as Ethereum and/or Bitcoin. In some cases, with non-ledger sourced tasks, a timing ledger may be similarly specified. Timeout windows may apply to various other operations. For example, a timeout may apply to the period a solver or verifier may have to challenge a determination against their favor. For example, a solver may have a timeout window to launch an appeal of a determination that the solver failed to correctly execute a task.

Similarly, a timeout window may exist for internal disputes. For example, A first node may send a message to a second node. The second may assert that the message was not received. The first node may have a timeout for submitting a grievance that the message was sent before the system proceeds assuming the message was not sent.

The solver and verifier(s) may release keys (e.g., solver keys and/or verifier keys) and/or salts corresponding to their commitments to reveal their corresponding outputs for the ordered set of operations in the contention protocol. The solver output may be compared to the one or more verifier outputs to implement the contention-based protocol. If a verifier output matches the solver output, the corresponding verifier may claim a verifier token set. If there is a mismatch, the solver and verifier may compete to establish that the mismatch was the result of an error by their counterpart. Establishing a counterpart error may allow the prevailing party to claim the counter-set of the party that committed the error. For example, a prevailing verifier may claim the solver counter-set (e.g., assert control of). For example, a prevailing solver may assert control of the verifier counter-set. In some cases, assertion of control of a token set may include transferring the tokens (or a portion thereof) to an account and/or identity associated with the party asserting control. In some cases, the controller-treasurer validation (or lack thereof) may authoritatively determine whether the assertion of control by the solver/verifier will be successful.

With regard to the executable code itself, a corresponding ordered set of operations may differ with differing code.

Figure 3:
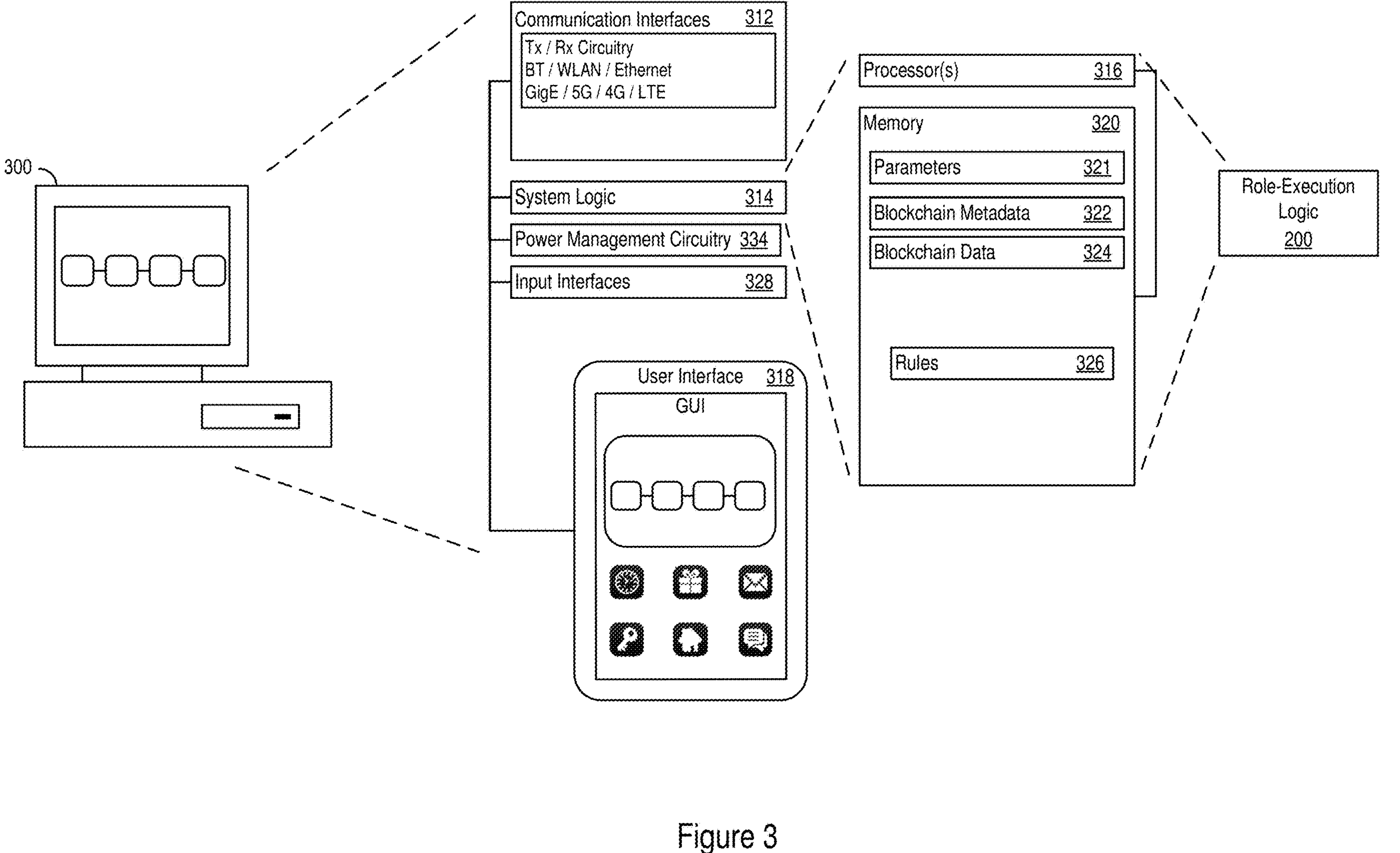
FIG. 3 shows an example role-execution system.

FIG. 3 shows an example role-execution system (RES) 300, which may provide a hardware environment for execution of role-execution protocol logic including the role-execution logic 200. When configured using role-execution logic, such as the example role-execution logic 200, the hardware of the RES 300 may be special purpose circuitry specifically configured to execute the operations various validation nodes, such a controller node, treasurer node, controller-treasurer node, and/or judge node. The RES 300 may include system logic 314 to support encryption and decryption; commitment generation; code validation; execution validation; and/or other code validation operations. The system logic 314 may include processors 316, memory 320, and/or other circuitry, which may be used to implement the example role-execution logic 200 and/or other ledger logic, which may be used to execute ledger updates and/or execute code.

The memory 320 may be used to store blockchain metadata 322 and/or blockchain data 324 used in role execution. The memory 320 may further store parameters 321, such as an encryption key values, generated random salt values, and/or other parameters that may facilitate sharing and manipulation of data. The memory may further store rules 326, which may support execution of role-based operations, implementation of blockchain consensus protocols, or other operations.

The memory 320 may further include applications and structures, for example, coded objects, templates, or one or more other data structures to support validation execution. The RES 300 may also include one or more communication interfaces 312, which may support wireless, e.g. Bluetooth, Wi-Fi, WLAN, cellular (5G, 4G, LTE/A), and/or wired, ethernet, Gigabit ethernet, optical networking protocols. Additionally, or alternatively, the communication interface 312 may support secure information exchanges, such as secure socket layer (SSL) or public-key encryption-based protocols for sending and receiving private data. The RES 300 may include power management circuitry 334 and one or more input interfaces 328.

The RES 300 may also include a user interface 318 that may include man-machine interfaces and/or graphical user interfaces (GUI). The GUI may be used to present options for validation confirmation, execution profile displays, token management, ledger operations, and/or other options.

The RES 300 may be deployed on distributed hardware. For example, various functions of the RES 300, e.g., while implementing role-execution logic, may be executed on cloud-based hardware, distributed static (and/or semi-static) network computing resources, and/or other distributed hardware systems. In various implementations, centralized and/or localized hardware systems may be used. For example, a unitary server or other non-distributed hardware system may perform role-execution logic operations.

The methods, devices, processing, and logic described above may be implemented in many different ways and in many different combinations of hardware and software. For example, all or parts of the implementations may be circuitry that includes an instruction processor, such as a Central Processing Unit (CPU), microcontroller, or a microprocessor; an Application Specific Integrated Circuit (ASIC), Programmable Logic Device (PLD), or Field Programmable Gate Array (FPGA); or circuitry that includes discrete logic or other circuit components, including analog circuit components, digital circuit components or both; or any combination thereof. The circuitry may include discrete interconnected hardware components and/or may be combined on a single integrated circuit die, distributed among multiple integrated circuit dies, or implemented in a Multiple Chip Module (MCM) of multiple integrated circuit dies in a common package, as examples.

The circuitry may further include or access instructions for execution by the circuitry. The instructions may be embodied as a signal and/or data stream and/or may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may particularly include a storage medium and instructions stored in or on the medium, and the instructions when executed by the circuitry in a device may cause the device to implement any of the processing described above or illustrated in the drawings.

The implementations may be distributed as circuitry, e.g., hardware, and/or a combination of hardware and software among multiple system components, such as among multiple processors and memories, optionally including multiple distributed processing systems. Parameters, databases, and other data structures may be separately stored and managed, may be incorporated into a single memory or database, may be logically and physically organized in many different ways, and may be implemented in many different ways, including as data structures such as linked lists, hash tables, arrays, records, objects, or implicit storage mechanisms. Programs may be parts (e.g., subroutines) of a single program, separate programs, distributed across several memories and processors, or implemented in many different ways, such as in a library, such as a shared library (e.g., a Dynamic Link Library (DLL)). The DLL, for example, may store instructions that perform any of the processing described above or illustrated in the drawings, when executed by the circuitry.

Various implementations have been specifically described. However, many other implementations are also possible.

Table 1 shows various examples.

TABLE 1

| Examples |
|---|
| 1. A method including:<br>accessing a registered task on a distributed ledger, the registered task including:<br>a reference to executable task code; and<br>a designation of a solver token set;<br>accepting the registered task by registering a solver token counter-set on the distributed ledger;<br>performing the registered task by:<br>executing the task code to generate a solver output, optionally including executing the task code to generate the solver output within a timeout window, optionally the timeout window being specified in a number of blocks (e.g., a block limit) added to a timing ledger, where option the timing ledger includes the distributed ledger;<br>generating a solver commitment by encrypting the solver output; and<br>causing recordation of the solver commitment on the distributed ledger;<br>responsive to a verifier causing recordation of a verifier commitment for the task on the distributed ledger, facilitating comparison of a corresponding verifier output with the solver output by releasing a solver key for the solver commitment;<br>optionally, asserting control of the solver token set at a time that:<br>the verifier output matches the solver output; or<br>the verifier output includes an error; and<br>optionally, surrendering the solver token counter-set at a time that:<br>the verifier output differs from the solver output; and<br>the solver output includes an error;<br>optionally, implementing one or more of the features above in a containerized deployment;<br>optionally, implementing one or more of the features above using a Kubeflow or similar pipeline;<br>optionally, implementing one or more of the features above using a la carte deployments via a state channel;<br>optionally, implementing one or more of the features above using a blockchain agnostic approach;<br>optionally, implementing one or more of the features above using an off-chain operation;<br>optionally, the method further includes one or more features of any other method in any other example in this table. |
| 1A. A method including implementing a solver-verifier challenge to verify code using a Kubeflow or similar pipeline based deployment, multiple component dispute resolution, off-chain solutions, chef state channels, a la carte deployment, or any combination thereof. |
| 2. The method of example 1 or any other example in this table, where executing the task code to generate a solver output includes executing a smart contract. |

TABLE 1-continued

| Examples |
| --- |
| 3. The method of example 1 or any other example in this table, where encrypting the solver output includes encrypting the solver output using an encryption scheme that allows verification that the solver commitment was generated using the solver output by use of the solver key. |
| 4. The method of example 1 or any other example in this table, where encrypting the solver output includes encrypting the solver output using a salt, where: |
| optionally, the salt is randomly generated, pseudorandomly generated, non-deterministically generated, operator-selected, or any combination thereof; and |
| optionally, the method further includes providing the salt along with the solver key. |
| 5. The method of example 1 or any other example in this table, where the registered task includes a task assigned by a task giver, where: |
| optionally, the task giver designates the solver token set. |
| 6. The method of example 1 or any other example in this table, where registered task further includes a designation of a verifier token set, the verifier token set available to the verifier when: |
| the verifier output matches the solver output; or |
| the verifier output differs from the solver output, and the solver output includes an error. |
| 7. The method of example 1 or any other example in this table, where executing the task code to generate a solver output includes executing the task code to generate the solver output within a timeout window and/or challenging an adverse determination regarding the solver output within the timeout window, where: |
| optionally, a designation of the timeout window is included within the registered task; |
| optionally, the timeout window is determined based on one or more characteristics of the executable task code, such as an expected runtime, a code size, a memory size, an average runtime, a comparison with other previously executed code, and/or other characteristic; and |
| optionally, the timeout window is determined based on a default value associated with the distributed ledger. |
| 8. The method of example 1 or any other example in this table, further including obtaining a token in the solver token counter-set, where: |
| optionally, obtaining the token in the solver token counter-set includes obtaining a previous solver token set from a previous task; and |
| optionally, obtaining the token in the solver token counter-set includes obtaining a previous solver token counter-set from a previous task. |
| 9. The method of example 1 or any other example in this table, further including reasserting control of the solver token counter-set along with asserting control of the solver token set. |
| 10. The method of example 1 or any other example in this table, where accepting the registered task includes recording a digitally-signed acceptance to the distributed ledger, where: |
| optionally, the acceptance includes a smart contract and/or executed smart contract result. |
| 10A. The method of example 1 or any other example in this table, further including causing recordation of an attempt to execute the task code, where: |
| optionally, the attempt record is signed using a client key specific to a solver or verifier client, where optionally, the signature is withheld unless the timeout window expires, when execution of the task code is uninterrupted; execution of the task code is incomplete; and/or the task code was inaccurately obtained; |
| optionally, the attempt recording includes a computational output metering record, where the computational output metering record includes an indication of computational resource usage during execution of the task code, where optionally, the computational resource usage includes processor cycles, memory operations, memory bus throughput, memory allocation, application execution duration, or other computational resource usage indications; |
| optionally, surrendering the solver or verifier token counter-set responsive to a timeout attributed to a non-attempt or interrupted attempt to execute the task code (e.g. solver's fault) |
| optionally, causing a penalty to a task giver when the timeout window is too short to execute the task code through a good attempt (e.g., task giver's fault). |
| 11. A method including: |
| accessing a registered task on a distributed ledger, the registered task including: |
| a reference to an executable task code; and |
| a designation of a verifier token set; |
| based on a solver token counter-set registered on the distributed ledger, determining that a solver has accepted the registered task; |
| verifying solver output for the registered task by: |
| executing the task code to generate a verifier output; |
| generating a verifier commitment by encrypting the verifier output; and |
| prior to release of a solver key for decryption of a solver commitment containing the solver output, causing recordation of the verifier commitment on the distributed ledger; |

TABLE 1-continued

| Examples |
| --- |
| coordinated with a solver releasing the solver key, facilitating comparison the verifier output with the solver output by releasing a verifier key for the verifier commitment;<br>optionally, asserting control of the verifier token set at a time that:<br>the verifier output matches the solver output or, optionally, as soon as the verifier posts the verifier commitment; and/or<br>optionally, asserting control the solver token counter-set at a time that:<br>the verifier output differs from the solver output; and<br>the solver output includes an error, where:<br>optionally, the method further includes one or more features of any other method in any other example in this table. |
| 12. The method of example 11 or any other example in this table, where executing the task code to generate a verifier output includes executing a smart contract. |
| 13. The method of example 11 or any other example in this table, where encrypting the verifier output includes encrypting the verifier output using an encryption scheme that allows verification that the verifier commitment was generated using the verifier output by use of the verifier key. |
| 14. The method of example 11 or any other example in this table, where encrypting the verifier output includes encrypting the verifier output using a salt, where:<br>optionally, the salt is randomly generated, pseudorandomly generated, non-deterministically generated, operator-selected, or any combination thereof; and<br>optionally, the method further includes providing the salt along with the verifier key. |
| 15. The method of example 11 or any other example in this table, where the registered task includes a task assigned by a task giver, where:<br>optionally, the task giver designates the verifier token set. |
| 16. The method of example 11 or any other example in this table, where registered task further includes a designation of a solver token set, the solver token set available to the solver when:<br>the verifier output matches the solver output; or<br>the verifier output differs from the solver output, and the verifier output includes an error. |
| 17. The method of example 11 or any other example in this table, the registered task includes an associated timeout window, where:<br>optionally, a designation of the timeout window is included within the registered task;<br>optionally, the timeout window is determined based on one or more characteristics of the executable task code, such as an expected runtime, a code size, a memory size, an average runtime, a comparison with other previously executed code, and/or other characteristic; and<br>optionally, the timeout window is determined based on a default value associated with the distributed ledger;<br>optionally, the method further includes asserting control of a solver token counter-set when a solver fails to complete execution of the task code within the timeout window. |
| 18. The method of example 1 or any other example in this table, further including obtaining a token in the verifier token counter-set, where:<br>optionally, obtaining the token in the verifier token counter-set includes obtaining a previous verifier token set from a previous task;<br>optionally, obtaining the token in the verifier token counter-set includes obtaining a previous verifier token set from a previous task;<br>optionally, obtaining the token in the solver token counter-set includes obtaining a previous solver token set from a previous task;<br>optionally, obtaining the token in the solver token counter-set includes obtaining a previous verifier token set from a previous task. |
| 19. The method of example 1 or any other example in this table, further including reasserting control of the verifier token counter-set along with asserting control of the verifier token set. |
| 20. A system including circuitry configured to implement the method of any other example in this table, where:<br>optionally, the circuitry is distributed; and<br>optionally, the circuitry includes memory and/or one or more hardware-based processors. |
| 21. A product including:<br>machine-readable media; and<br>instructions stored on the machine-readable media, the instructions configured to cause a machine to implement the method of any other example, where:<br>optionally, the machine-readable media is other than a transitory signal;<br>optionally, the machine-readable media is non-transitory;<br>optionally, the instructions are executable. |
| 22. A method including implementing any feature or combination of features in the description and/or drawings. |
| 23. A system including circuitry configured to implement any feature or combination of features in the description and/or drawings, where:<br>optionally, the circuitry is distributed; and |

TABLE 1-continued

| Examples |
| --- |
| optionally, the circuitry includes memory and/or one or more hardware-based processors. |
| 24. A product including: |
| machine-readable media; and |
| instructions stored on the machine-readable media, the instructions configured to cause a machine to implement any feature or combination of features in the description and/or drawings, where: |
| optionally, the machine-readable media is other than a transitory signal; |
| optionally, the machine-readable media is non-transitory; |
| optionally, the instructions are executable. |
| 1B. A method including: |
| accessing, via a controller-treasurer node and within off-chain storage, a transcript provided at least in part by a solver node, the transcript including an execution profile for at least executable code designated for a task, the off-chain storage including a first storage location unrecorded within a chain associated with a distributed ledger; |
| determining, based on the transcript, that the solver node correctly executed the executable code for the task; |
| committing, via the controller-treasurer node and responsive to the determination, an indication for the distributed ledger that the solver node correctly executed the executable code for the task to validate the execution by the solver node for the distributed ledger; and |
| causing the indicator to be recorded on-chain for the distributed ledger, the on-chain recording including a recordation location within a cryptographic structure associated with the distributed ledger. |
| 2B. The method of example 1B or any other example in this table, where validating the execution by the solver node for the ledger includes validating at least a portion of the transcript for the distributed ledger. |
| 3B. The method of example 1B or any other example in this table, where the transcript includes a record of a verifier challenge. |
| 4B. The method of example 3B or any other example in this table, where validating the execution by the solver node for the ledger includes causing transfer of token-set and/or counter-set responsive to the correctly executed executable code determined the controller-treasurer node. |
| 5B. The method of example 1B or any other example in this table, where the controller-treasurer node includes a node executing a controller role and/or a treasurer role. |
| 6B. The method of example 1B or any other example in this table, where the first storage location includes an on-chain referenced location for another distributed ledger. |
| 7B. The method of example 6B or any other example in this table, where validating the execution by the solver node includes analyzing a judgment provided for the another distributed ledger by a judge node associated with the another distributed ledger. |
| 8B. The method of example 1B or any other example in this table, where validating the execution by the solver node includes analyzing a judgment in off-chain storage, the judgment provided a judge node. |
| 9B. The method of example 1B or any other example in this table, where the execution profile includes an ordered set of transactions detailing a solution for the executable code. |
| 10B. The method of example 9B or any other example in this table, where the transcript further includes a record of a reveal action of the solution by the solver node. |
| 11B. The method of example 10B or any other example in this table, where the record of the reveal action indicated that the reveal action occurred prior to an end of a timeout window for execution. |
| 12B. The method of example 1B or any other example in this table, where indication for the distributed ledger that the solver node correctly executed the executable code includes a referenceable validation of an output value from the correctly executed executable code. |
| 13B. A system including: |
| communication circuitry configured to access, via a controller-treasurer node and within off-chain storage, a transcript provided at least in part by a solver node, the transcript including an execution profile for at least executable code designated for a task, the off-chain storage including a first storage location unrecorded within a chain associated with a distributed ledger; and |
| role-execution circuitry configured to: |
| determine, based on the transcript, that the solver node correctly executed the executable code for the task; |
| commit, via the controller-treasurer node and responsive to the determination, an indication for the distributed ledger that the solver node correctly executed the executable code for the task to validate the execution by the solver node for the distributed ledger; and |
| cause the indicator to be recorded on-chain for the distributed ledger, the on-chain recording including a recordation location within a cryptographic structure associated with the distributed ledger. |
| 14B. The system of example 13B or any other example in this table, where the role-execution circuitry is configured to validate the execution by the |

TABLE 1-continued

| Examples |
| --- |
| solver node for the ledger by validating at least a portion of the transcript for the distributed ledger. |
| 15B. The system of example 13B or any other example in this table, where the transcript includes a record of a verifier challenge. |
| 16B. The system of example 15B or any other example in this table, where the role-execution circuitry is configured to validate the execution by the solver node for the ledger by causing transfer of token-set and/or counter-set responsive to the correctly executed executable code determined the controller-treasurer node. |
| 17B. The system of example 13B or any other example in this table, where the controller-treasurer node includes a node executing a controller role and/or a treasurer role. |
| 18B. A product including: machine-readable media other than a transitory signal; and instructions stored on the machine-readable media, the instructions configured to, when executed, cause a processor to: access, via a controller-treasurer node and within off-chain storage, a transcript provided at least in part by a solver node, the transcript including an execution profile for at least executable code designated for a task, the off-chain storage including a first storage location unrecorded within a chain associated with a distributed ledger; determine, based on the transcript, that the solver node correctly executed the executable code for the task; commit, via the controller-treasurer node and responsive to the determination, an indication for the distributed ledger that the solver node correctly executed the executable code for the task to validate the execution by the solver node for the distributed ledger; and cause the indicator to be recorded on-chain for the distributed ledger, the on-chain recording including a recordation location within a cryptographic structure associated with the distributed ledger. |
| 19B. The product of example 18B or any other example in this table, where the first storage location includes an on-chain referenced location for another distributed ledger. |
| 20B. The product of example 18B or any other example in this table, where the execution profile includes an ordered set of transactions detailing a solution for the executable code. |

Headings and/or subheadings used herein are intended only to aid the reader with understanding described implementations. The invention is defined by the claims.

What is claimed is:

1. A method including:

accessing, via a controller-treasurer node and within off-chain storage, a transcript provided at least in part by a participant node, the transcript including an execution profile for at least executable code designated for a task, the off-chain storage including a first storage location unrecorded within a chain associated with a distributed ledger, where the transcript references a commitment by the participant to a particular solution for the executable code and a reveal of the solution for the executable code occurring after provision of the commitment, the commitment binding the participant node to the particular solution prior to the reveal of the solution for the executable code;

determining, based on the references to the commitment and the reveal within the transcript, that the participant node correctly executed the executable code for the task;

committing, via the controller-treasurer node and responsive to the determination, an indication for the distributed ledger that the participant node correctly executed the executable code for the task to validate the execution by the participant node for the distributed ledger; and causing the indicator to be recorded on-chain for the distributed ledger, the on-chain recording including a recordation location within a cryptographic structure associated with the distributed ledger.

2. The method of claim 1, where validating the execution by the participant node for the ledger includes validating at least a portion of the transcript for the distributed ledger.

3. The method of claim 1, where the transcript includes a record of a verifier challenge.

4. The method of claim 3, where validating the execution by the participant node for the ledger includes causing transfer of token-set and/or counter-set responsive to the correctly executed executable code determined by the controller-treasurer node.

5. The method of claim 1, where the controller-treasurer node includes a node executing a controller role and/or a treasurer role.

6. The method of claim 1, where the first storage location includes an on-chain referenced location for another distributed ledger.

7. The method of claim 6, where validating the execution by the participant node includes analyzing a judgment provided for the another distributed ledger by a judge node associated with the another distributed ledger.

8. The method of claim 1, where validating the execution by the participant node includes analyzing a judgment in off-chain storage, the judgment provided a judge node.

9. The method of claim 1, where the execution profile includes an ordered set of transactions detailing a solution for the executable code.

10. The method of claim 9, where the transcript further includes a record of a reveal action of the solution by the participant node.

11. The method of claim 10, where the record of the reveal action indicated that the reveal action occurred prior to an end of a timeout window for execution.

12. The method of claim 1, where the indication for the distributed ledger that the participant node correctly executed the executable code includes a referenceable validation of an output value from the correctly executed executable code.

13. A system including:

communication circuitry configured to access, via a controller-treasurer node and within off-chain storage, a transcript provided at least in part by a participant node, the transcript including an execution profile for at least executable code designated for a task, the off-chain storage including a first storage location unrecorded within a chain associated with a distributed ledger, where the transcript references a commitment by the participant to a particular solution for the executable code and a reveal of the solution for the executable code occurring after provision of the commitment, the commitment binding the participant node to the particular solution prior to the reveal of the solution for the executable code; and role-execution circuitry configured to:

determine, based on the references to the commitment and the reveal within the transcript, that the participant node correctly executed the executable code for the task;

commit, via the controller-treasurer node and responsive to the determination, an indication for the distributed ledger that the participant node correctly executed the executable code for the task to validate the execution by the participant node for the distributed ledger; and cause the indicator to be recorded on-chain for the distributed ledger, the on-chain recording including a recordation location within a cryptographic structure associated with the distributed ledger.

14. The system of claim 13, where the role-execution circuitry is configured to validate the execution by the participant node for the ledger by validating at least a portion of the transcript.

15. The system of claim 13, where the transcript includes a record of a verifier challenge.

16. The system of claim 15, where the role-execution circuitry is configured to validate the execution by the participant node for the ledger by causing transfer of token-set and/or counter-set responsive to the correctly executed executable code determined the controller-treasurer node.

17. The system of claim 13, where the controller-treasurer node includes a node executing a controller role and/or a treasurer role.

18. A product including:

machine-readable media other than a transitory signal; and instructions stored on the machine-readable media, the instructions configured to, when executed, cause a processor to:

access, via a controller-treasurer node and within off-chain storage, a transcript provided at least in part by a participant node, the transcript including an execution profile for at least executable code designated for a task, the off-chain storage including a first storage location unrecorded within a chain associated with a distributed ledger, where the transcript references a commitment by the participant to a particular solution for the executable code and a reveal of the solution for the executable code occurring after provision of the commitment, the commitment binding the participant node to the particular solution prior to the reveal of the solution for the executable code;

determine, based on the references to the commitment and the reveal within the transcript, that the participant node correctly executed the executable code for the task;

commit, via the controller-treasurer node and responsive to the determination, an indication for the distributed ledger that the participant node correctly executed the executable code for the task to validate the execution by the participant node for the distributed ledger; and cause the indicator to be recorded on-chain for the distributed ledger, the on-chain recording including a recordation location within a cryptographic structure associated with the distributed ledger.

19. The product of claim 18, where the first storage location includes an on-chain referenced location for another distributed ledger.

20. The product of claim 18, where the execution profile includes an ordered set of transactions detailing a solution for the executable code.

* * * * *